United States Patent
Stafford et al.

(10) Patent No.: US 11,210,463 B2
(45) Date of Patent: Dec. 28, 2021

(54) DETECTING ERRORS IN SPREADSHEETS

(71) Applicants: INTERNATIONAL BUSINESS MACHINES CORPORATION, Armonk, NY (US); University of York, York (GB)

(72) Inventors: Robin Ward Stafford, North Yorkshire (GB); Alexandros Komninos, York (GB); Jonathan Co, York (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/797,040

(22) Filed: Feb. 21, 2020

(65) Prior Publication Data
US 2021/0150139 A1    May 20, 2021

(30) Foreign Application Priority Data

Nov. 19, 2019  (GB) ..................... 1916800

(51) Int. Cl.
| | | |
|---|---|---|
| G06F 40/211 | (2020.01) | |
| G06N 5/02 | (2006.01) | |
| G06F 40/169 | (2020.01) | |
| G06F 40/284 | (2020.01) | |
| G06F 40/18 | (2020.01) | |

(52) U.S. Cl.
CPC .......... *G06F 40/211* (2020.01); *G06F 40/169* (2020.01); *G06F 40/18* (2020.01); *G06F 40/284* (2020.01); *G06N 5/02* (2013.01)

(58) Field of Classification Search
CPC .... G06F 40/211; G06F 40/284; G06F 40/169; G06F 40/18; G06N 5/02

USPC .......................................................... 715/212
See application file for complete search history.

(56) References Cited

U.S. PATENT DOCUMENTS

| | | | | |
|---|---|---|---|---|
| 5,259,766 A | * | 11/1993 | Sack | .................. G09B 19/0053 434/323 |
| 5,604,854 A | | 2/1997 | Glassey | |
| 5,842,180 A | | 11/1998 | Khanna | |
| 5,987,481 A | | 11/1999 | Michelman | |
| 6,029,002 A | * | 2/2000 | Afifi | ........................ G06F 8/433 714/E11.209 |
| 6,804,682 B1 | * | 10/2004 | Kemper | .................... G06F 8/72 |
| 6,829,621 B2 | | 12/2004 | Keller | |

(Continued)

FOREIGN PATENT DOCUMENTS

EP    1622045 B1    2/2006

OTHER PUBLICATIONS

Vaidehi Joshi; Leveling Up One's Parsing Game with ASTs; Dec. 4, 2017; Medium.com; pp. 1-19.*

(Continued)

*Primary Examiner* — Andrew R Dyer
(74) *Attorney, Agent, or Firm* — Anthony Curro (57) ABSTRACT

Proposed are concepts of transforming a spreadsheet (or set of spreadsheets) into a knowledge base for analysis and error detection. Such a concept may convert a spreadsheet into an abstracted model that facilitates error detection. For instance, by turning the semi-structured cell-based data representation into a structured abstract model, it may be possible to perform analysis and/or error detection that would otherwise not be possible with the existing cell-based tools.

15 Claims, 7 Drawing Sheets

(56) References Cited

U.S. PATENT DOCUMENTS

| | | | |
|---|---|---|---|
| 6,948,154 B1* | 9/2005 | Rothermel | G06F 40/18 717/128 |
| 7,530,012 B2 | 5/2009 | Medicke | |
| 7,716,167 B2 | 5/2010 | Colossi et al. | |
| 7,774,302 B2 | 8/2010 | Arras et al. | |
| 8,239,750 B2 | 8/2012 | Thomsen | |
| 8,990,675 B2 | 3/2015 | Folting et al. | |
| 9,104,659 B2* | 8/2015 | Treadwell | G06F 21/6245 |
| 9,158,832 B1* | 10/2015 | Hiatt | G06F 40/18 |
| 9,367,423 B1* | 6/2016 | Ovadia | G06F 11/362 |
| 9,886,518 B1* | 2/2018 | Xu | G06F 8/427 |
| 10,083,016 B1* | 9/2018 | Norman | G06F 16/2443 |
| 10,789,182 B2* | 9/2020 | Bell | G06F 13/126 |
| 2002/0091707 A1 | 7/2002 | Keller | |
| 2003/0009649 A1 | 1/2003 | Martin | |
| 2004/0205524 A1 | 10/2004 | Richter | |
| 2004/0221855 A1* | 11/2004 | Ashton | G06F 19/345 128/898 |
| 2004/0237029 A1 | 11/2004 | Medicke | |
| 2006/0015805 A1 | 1/2006 | Humenansky | |
| 2006/0026012 A1* | 2/2006 | Campbell | G06Q 10/10 702/182 |
| 2007/0014385 A1* | 1/2007 | Shiraishi | G11B 20/10046 375/341 |
| 2007/0083875 A1* | 4/2007 | Jennings | G06Q 10/063 719/330 |
| 2007/0162840 A1* | 7/2007 | Rochelle | G06F 16/972 715/210 |
| 2007/0220063 A1* | 9/2007 | O'Farrell | G06F 16/258 |
| 2008/0069448 A1* | 3/2008 | Turner | G06F 40/284 382/190 |
| 2009/0077617 A1* | 3/2009 | Levow | H04L 63/1416 726/1 |
| 2010/0169758 A1 | 7/2010 | Thomsen | |
| 2010/0274744 A1* | 10/2010 | Brdiczka | G06N 5/02 706/12 |
| 2011/0030057 A1* | 2/2011 | Chen | H04L 69/22 726/23 |
| 2011/0131546 A1* | 6/2011 | Elaasar | G06F 8/10 717/105 |
| 2012/0011094 A1* | 1/2012 | Yamagaki | G06F 7/02 706/45 |
| 2012/0042242 A1* | 2/2012 | Garland | G06F 40/111 715/256 |
| 2012/0079463 A1* | 3/2012 | Freeman | G06F 8/70 717/137 |
| 2012/0143831 A1 | 6/2012 | Amulu | |
| 2012/0151457 A1* | 6/2012 | Gennard | G06F 8/433 717/146 |
| 2012/0254830 A1* | 10/2012 | Conrad | G06F 8/35 717/106 |
| 2013/0132381 A1* | 5/2013 | Chakrabarti | G06F 16/532 707/730 |
| 2014/0372993 A1* | 12/2014 | Hoban | G06F 8/437 717/143 |
| 2015/0095312 A1 | 4/2015 | Gulwani et al. | |
| 2015/0186504 A1 | 7/2015 | Gorman | |
| 2016/0004684 A1 | 1/2016 | Cudak | |
| 2017/0037238 A1 | 2/2017 | Kushihara | |
| 2017/0075973 A1 | 3/2017 | Miranker | |
| 2017/0091293 A1* | 3/2017 | Cummings | G06F 40/211 |
| 2017/0228357 A1* | 8/2017 | Hirzel | G06F 40/18 |
| 2017/0228358 A1* | 8/2017 | Hirzel | G06F 40/18 |
| 2018/0150531 A1 | 5/2018 | Demonsant | |
| 2018/0196868 A1 | 7/2018 | Riggs | |
| 2018/0203838 A1* | 7/2018 | Hiatt | G06F 16/285 |
| 2018/0276417 A1* | 9/2018 | Cerezo Sanchez | G06F 21/74 |
| 2018/0285347 A1* | 10/2018 | Mizobuchi | G06F 40/247 |
| 2019/0087400 A1 | 3/2019 | Chavoustie | |
| 2019/0278853 A1 | 9/2019 | Chen | |
| 2019/0361868 A1* | 11/2019 | Rogynskyy | G06F 16/90344 |
| 2020/0402541 A1* | 12/2020 | Talbot | G11B 27/005 |
| 2021/0049421 A1* | 2/2021 | Tandecki | G06K 9/6256 |
| 2021/0149919 A1 | 5/2021 | Nelmes | |
| 2021/0149920 A1 | 5/2021 | Nelmes | |
| 2021/0149926 A1 | 5/2021 | Komninos | |

OTHER PUBLICATIONS

Ahmad et al., "A Type System for Statically Detecting Spreadsheet Errors," Proceedings of the 18th IEEE International Conference on Automated Software Engineering (ASE'03), 2003, IEEE, pp. 1-10.

Aivaloglou et al., "Parsing Excel formulas: A grammar and its application on four large datasets," Journal of Software: Evolution and Process, 0000; 00:1-24, Published online in Wiley InterScience (www.interscience.wiley.com), DOI:10.1002/smr.

Barowy et al., ExceLint: Automatically Finding Spreadsheet Formula Errors, Proc. ACM Program Lang. vol. 2 No. OOPSLA, Article 148, Publication date: Nov. 2018., pp. 148-148.26.

Chambers et al., "Dimension Inference in Spreadsheets," 2008 IEEE Symposium on Visual Languages and Human-Centric Computing (VLJHCC), pp. 123-130.

Cunha, "Explaining spreadsheets with spreadsheets (Short Paper)," GPCE '18, Nov. 5-6, 2018, Boston, MA, USA, pp. 161-167.

Erwig, "Typed Table Transformations," Oregon State University, arXiv:1809.02746v1 [cs.SE] Sep. 8, 2018, https://arxiv.org/pdf/1809.02746.pdf, pp. 1-5.

Kankuzi, "Dynamic Translation of Spreadsheet Formulas to Problem Domain Narratives," PPIG 2017—28th Annual Conference, 2017, http://www.ppig.org/library/paper/dynamic-translation-spreadsheet-formulas-problem-domain-narratives. pp. 1-10.

Koch et al., "On the refinement of spreadsheet smells by means of structure information," Preprint Submitted to JSS, Special Issue on Program Debugging, Oct. 11, 2018, https://arxiv.org/abs/1810.04542, pp. 1-48.

Koci et al., "A Machine Learning Approach for Layout Inference in Spreadsheets," In Proceedings of the 8th International Joint Conference on Knowledge Discovery, Knowledge Engineering and Knowledge Management (IC3K 2016)—vol. 1: KDIR, pp. 77-88.

Koci et al., "XLIndy: Interactive Recognition and Information Extraction in Spreadsheets," DocEng '19: Proceedings of the ACM Symposium on Document Engineering 2019, Sep. 2019, Article No. 25, pp. 1-4.

Li et al., "WARDER: Refining Cell Clustering for Effective Spreadsheet Defect Detection via Validity Properties," 2019 IEEE 19th International Conference on Software Quality, Reliability and Security (QRS), pp. 139-150.

IBM, List of IBM Patents or Patent Applications Treated as Related, Appendix P, dated Sep. 9, 2021, 2 pages.

* cited by examiner

DETECTING ERRORS IN SPREADSHEETS

BACKGROUND

The present invention relates to detecting errors in spreadsheets, and more particularly, to detecting errors in a spreadsheet comprising pluralities of formulae. The present invention further relates to a computer program product comprising computer-readable program code that enables a processor of a processing system to implement such a method. The present invention further relates to a system for detecting errors in a spreadsheet comprising pluralities of formulae.

Spreadsheets are a way of storing and representing data in a semi-structured way. The data is arranged in cells which are arranged in rows and columns. Data may be text, numeric or represent a date or time. The data displayed may be directly input or calculated. There is no distinction in a spreadsheet between data (for example, a number of sales from a given store) and metadata (for example, the name of the store). A spreadsheet may therefore be thought of as being a semi-structured cell-based data representation.

SUMMARY

The present invention seeks to provide a system for detecting an error in a spreadsheet comprising a plurality of formulae that may allow a user to analyze a spreadsheet, understand what is being represented, and/or highlight possible errors in formulae of the spreadsheet.

The present invention also seeks to provide a method for method for detecting errors in a spreadsheet comprising pluralities of formulae. Such a method may be computer-implemented. The present invention further seeks to provide a computer program product including computer program code for implementing the proposed concepts when executed on a processor.

According to an embodiment of the present invention there is provided a system for detecting errors in a spreadsheet comprising pluralities of formulae. The system comprises a conversion component configured to convert each formula of the spreadsheet into a respective Abstract Syntax Tree (AST). The system also comprises a pattern encoding component configured to encode the structure of each AST as a pattern. The system yet further comprises a comparison component configured to compare the patterns to identify an anomalous formula based on the comparison result.

Proposed is a concept of transforming a spreadsheet (or set of spreadsheets) into a knowledge base for analysis and error detection. Such a concept may convert a spreadsheet into an abstracted model that facilitates error detection. For instance, by turning the semi-structured cell-based data representation into a structured abstract model, it may be possible to perform analysis and/or error detection that would otherwise not be possible with the existing cell-based tools.

By way of example, proposed embodiments may be adapted to convert formulae of a spreadsheet into Abstract Syntax Trees (ASTs) and then use pattern matching to identify highlight anomalous formulae. Embodiments may therefore employ a pattern matching approach for error detection in spreadsheets.

In particular, the inventors propose the analysis of models derived from individual cell formula using a structural pattern-based approach. Such an approach may identify individual sections of a cell formula that may be erroneous. In this way, embodiments be able to analyse a spreadsheet for error detection purposes without needing to find interrelationships within the spreadsheet. Also, by employing a pattern matching approach to analysing formulae of a spreadsheet, embodiments may be able to detect similarities between formulae in different locations in the spreadsheet (which conventional approaches to spreadsheet analysis may not be able to do).

For example, the comparison component may be configured to, for each pattern, compare the pattern against all of the other patterns to determine differences between the patterns. The comparison component may then identify an anomalous formula based on the determined differences. In this way, encoded patterns may be compared by a) number of occurrences or b) string metrics, so as to detect potential user create formula errors within a spreadsheet. Introduction of other attributes into such comparison may also make for more robust error detection.

Some embodiments may also comprise a classification component configured to classify the identified anomalous formula based on a determined difference between two patterns and a number of occurrences of at least one of the two patterns. Thus, not only may embodiments identify erroneous formulae, proposed embodiments may also classify identified erroneous formulae so as to facilitate simple identification of formulae characteristics.

The comparison component may comprise: a pattern detection unit configured to detect a first pattern having: a low occurrence; and a small difference from a pattern having a high occurrence; and an identification unit configured to identify the respective formula of the AST corresponding to the detected first pattern as a first anomalous formula. Furthermore, the identification unit may be further configured to identify the first anomalous formula as an incorrectly typed formula.

In some embodiments, the comparison component may comprise: a pattern detection unit configured to detect a second pattern having: a high occurrence; and a small difference from a pattern having a high occurrence; and an identification unit configured to identify the respective formula of the AST corresponding to the detected second pattern as a second anomalous formula. Also, the identification unit may be further configured to identify the second anomalous formula as a duplicated formula.

The comparison component of some embodiments may comprise: a pattern detection unit configured to detect a third pattern having: a low occurrence; and a large difference from all other patterns; and an identification unit configured to identify the respective formula of the AST corresponding to the detected third pattern as a third anomalous formula. The identification unit may also be configured to identify the third anomalous formula as an outlier formula.

It will therefore be appreciated that proposed embodiments may enable different types of anomalous formulae to be detected and identified. Thus, rather than being limited to only detecting a single type/class of error, embodiments may facilitate the identification of many different types of error in spreadsheet formulae.

The conversion component may be configured to: parse the formula; tokenize the formula; construct a Concrete Syntax Tree, CST, based on the token of the formula; annotate each node of the CST with a type identifier; and convert the annotated CST to an AST. In converting the annotated CST to an AST, the conversion component may remove a node from the annotated CST which has an annotation belonging to a set of target annotations. Standard/conventional AST generation techniques/algorithms that are widely known and available may therefore be leveraged by proposed embodiments. This may help to reduce implementation cost and/or complexity, for example by supporting the use of commercial off-the-shelf components.

To assist in pattern matching, some embodiments may also include a pattern processing component configured to order and group the patterns by number of occurrences. Such ordering and grouping may facilitate more efficient pattern matching, thus reduced computational/resource requirements.

Embodiments may be employed in combination with conventional/existing spreadsheet analysis systems. In this way, embodiments may integrate into legacy systems so as to improve and/or extend their functionality and capabilities. An improved spreadsheet analysis system may therefore be provided by proposed embodiments.

According to another aspect, there is provided a computer-implemented method for detecting errors in a spreadsheet comprising pluralities of formulae. The method includes converting each formula of the spreadsheet into a respective abstract syntax tree, AST. The method also includes encoding the structure of each AST as a pattern. The method further includes comparing the patterns to identify an anomalous formula based on the comparison result.

According to another embodiment of the present invention, there is provided a computer program product for detecting errors in a spreadsheet comprising pluralities of formulae, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

Thus, there may be proposed a concept for detecting erroneous or anomalous formulae in a spreadsheet. Such a concept may use model-based techniques to transform a spreadsheet (or set of spreadsheets) into a knowledge base for analysis and error detection.

BRIEF DESCRIPTION OF THE DRAWINGS

Preferred embodiments of the present invention will now be described, by way of example only, with reference to the following drawings, in which.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

Reference to a spreadsheet should be taken to refer to an electronic or digital spreadsheet as would be understood according to its normal meaning by a skilled person. For instance, a spreadsheet will be understood to be an electronic or digital data file that comprises a semi-structured cell-based data representation within which data is provided in cells (arranged in rows and columns) that is used or made available by a computing device.

Also, reference to an Online Analytical Processing (OLAP) model should be taken to refer to a structured representation of data which is configured to facilitate detailed data analysis. OLAP models are built from cubes. Each cube contains several dimensions. The elements in a dimension may contain hierarchical relationships to each other. Data items within the cube may be related to each other by calculations.

Further, reference to a dimension should be taken to refer to an OLAP dimension, which is a component of an OLAP cube. A geometric cube contains three dimensions x, y and z. To refer to a location in the cube you give a co-ordinate for each dimension, for example (2, 3, 7). By analogy, an OLAP cube is made up of OLAP dimensions. Each dimension is a collection of members each of a similar type, for example months is frequently a dimension, as are products or geographic location. Thus, to refer to a given cell in an OLAP cube, one would use a member of each of its dimensions. For example, where a cube contains the dimensions: months, product, location, an example of a cell location would be (January 2019, Loaf of Bread, South East). Further, OLAP dimensions may have hierarchies. For example, the months in 2019 may be children of the dimension 2019.

Spreadsheets are widely used. However, due to their flexible nature, they are notorious for being difficult to understand, especially for a user other than the author/creator of the spreadsheet. Also, spreadsheets often contain hidden errors. For such reasons, there exist various approaches for analyzing spreadsheets in order to gain an improved understanding of spreadsheet content and/or highlight potential errors. However, such approaches have various drawbacks (such limited functionality or scope of application).

Proposed are concepts for turning a spreadsheet into a structured abstract model that facilitates analysis for the purpose of identify erroneous or anomalous formulae within the spreadsheet. Using such an approach, embodiments may facilitate analysis and error detection that would not otherwise be possible with the existing cell-based spreadsheet analysis tools.

By way of example, a proposed approach may be summarised as comprising the following three steps or stages:

(i) Encode each spreadsheet formula into a pattern and obtain a set of unique patterns;

(ii) Compare the patterns against each other to form a number of metrics; and (iii) Identify, from the metrics, an error in a formula (if one exists).

In particular, such an exemplary approach may employ the idea of converting formulae into abstract syntax trees, which are then encoded into patterns. Pattern matching may then be used to highlight anomalous formulae.

By way of initial illustration, let us now consider the following example of a simple spreadsheet including the following cells:

| A | B | C | D |
|---|---|---|---|
| 1 | Volume | Price | Revenue |
| 2 | 5 | 10 | 50 |
| 3 | 7 | 5 | 35 |

The above spreadsheet would contain two formulae: D2=B2*C2 and D3=B3*D3. By grouping the formula together and identifying the types of labels, both formula can be mapped to the single formula group. Revenue=Volume*Price.

The ratio of individual text cells to grouped text items can be 100s to 1. Therefore gaining an understanding of the metadata by workbook by looking at the text groups is far easier than scanning through every individual text cell. Also, mistakes are much easier to identify, because the number of times a unique text item will appear should typically be the same in each text group. Embodiments may identify where this is not the case in an exception report.

Also, the ratio of individual formulae to formula groups can be 100s to 1. Therefore, gaining an understanding of the logic in the workbook by looking at the formula groups is far easier than scanning through every individual formula, particularly because the formula groups are in business language rather than cell references. Formulae that have errors in them will create unexpected formula groups which would probably only occur a few times making identification much easier. Embodiments may identify such errors in an exception report.

Figure 1:
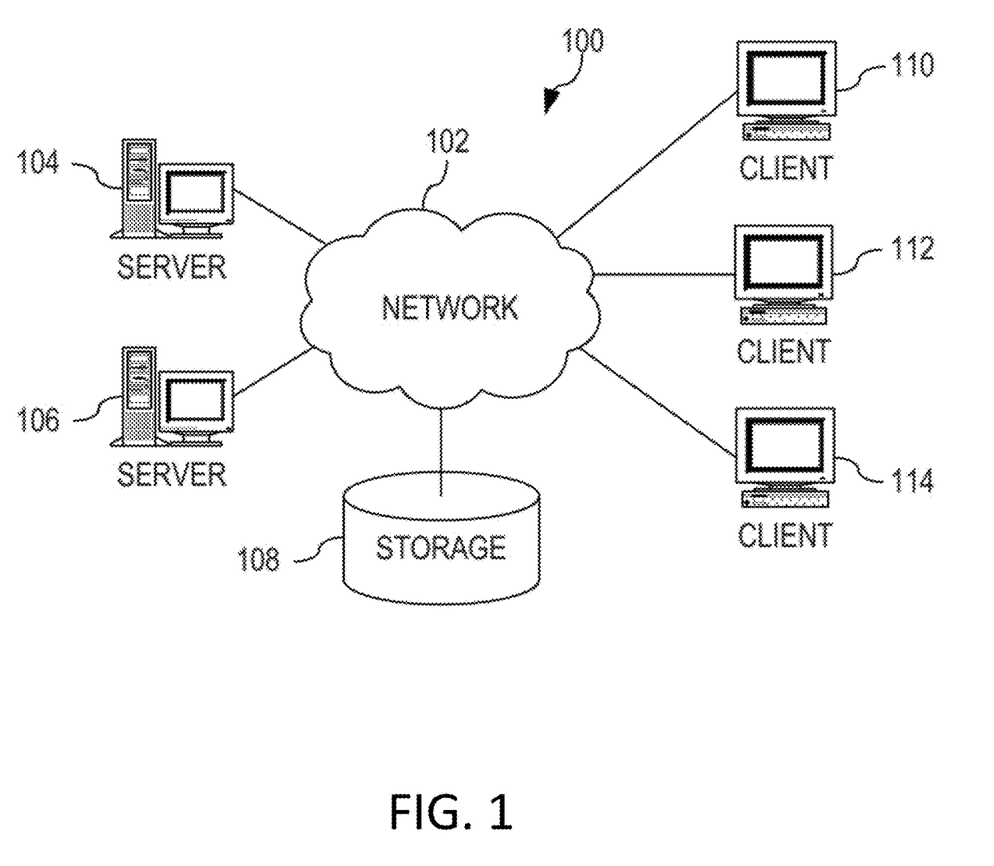
FIG. 1 depicts a pictorial representation of an example distributed system in which aspects of the illustrative embodiments may be implemented.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
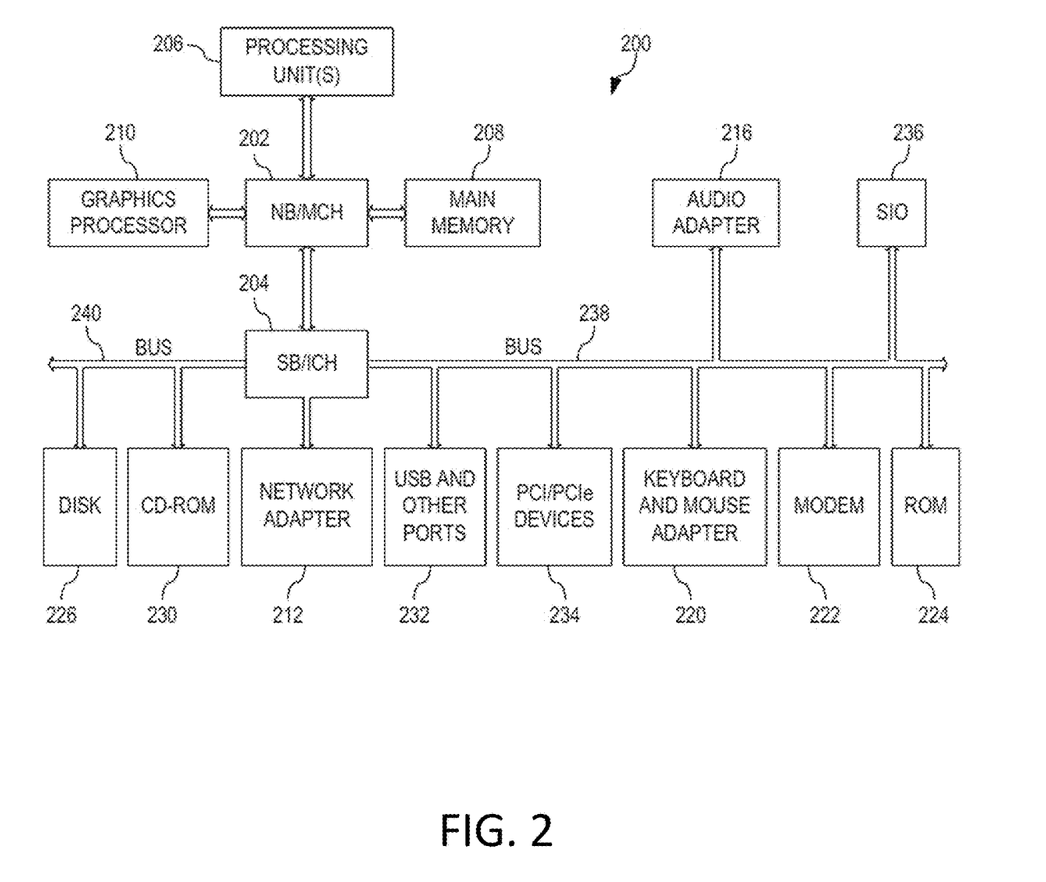
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, a proposed embodiment may be partly implemented in a processing unit 206 of the system 200.

In the depicted example, the system 200 employs a hub architecture including a north bridge and memory controller hub (NB/MCH) 202 and a south bridge and input/output (I/O) controller hub (SB/ICH) 204. Thus, another proposed embodiment may be implemented in the memory controller hub 202 of the system 200. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200. Java and all Java-based trademarks and logos are trademarks or registered trademarks of Oracle and/or its affiliates.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. IBM, eServer, AIX, and System p5 are trademarks of International Business Machines Corporation, registered in many jurisdictions worldwide. Linux is a registered trademark of Linus Torvalds in the United States, other countries, or both.

Instructions for the operating system, the programming system, and applications or programs are located on storage devices, such as HDD 226, and may be loaded into main memory 208 for execution by processing unit 206. Similarly, one or more programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments may provide a method and system for detecting an error in a spreadsheet comprising a plurality of formulae. In such embodiments, each formula of the spreadsheet may be converted to an AST, the structure of which is then encoded into a pattern. These obtained patterns may then be analyzed with one or more pattern matching processes to identify one or more anomalous formula of the spreadsheet.

Figure 3:
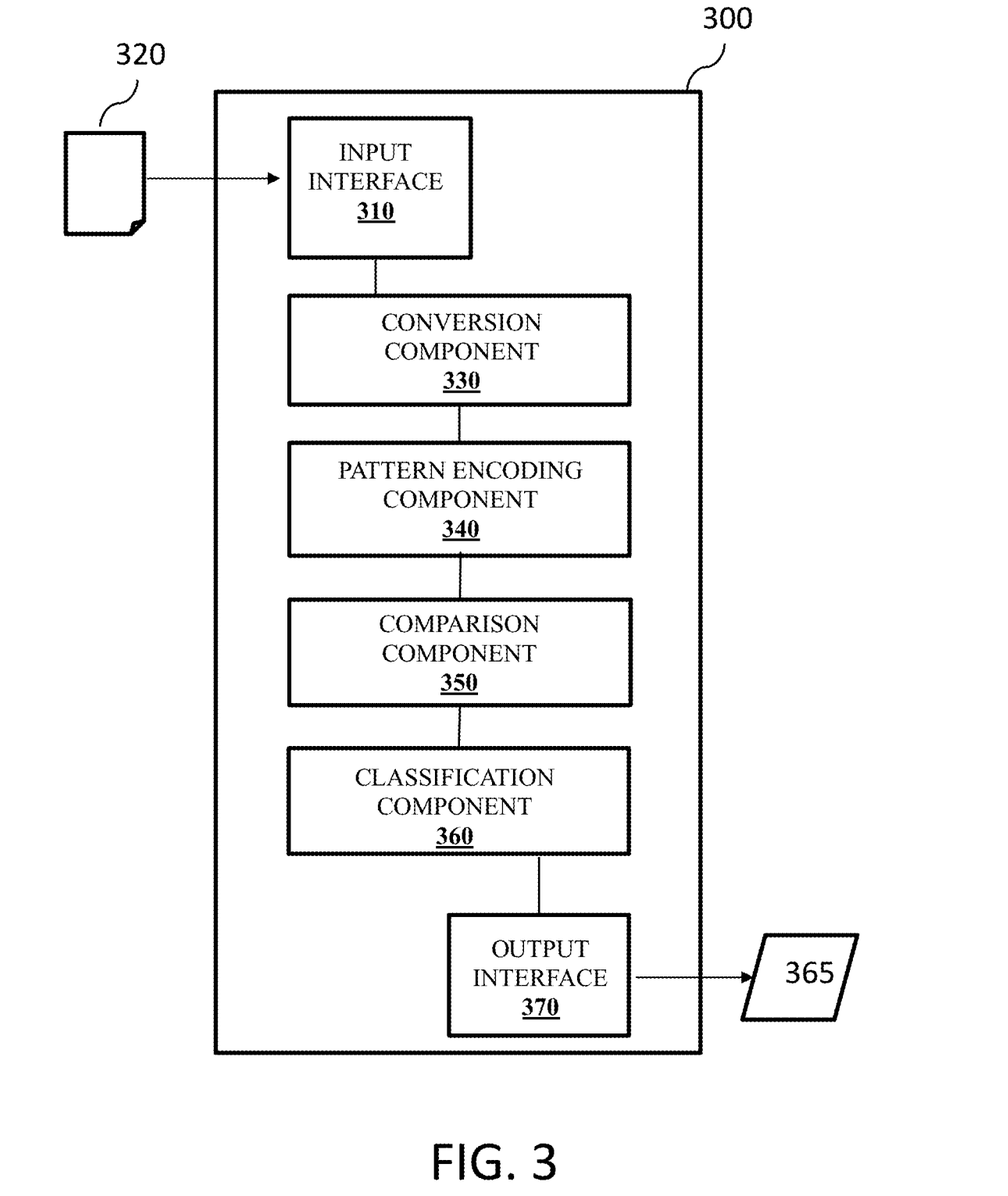
FIG. 3 is a simplified block diagram of proposed system according to an embodiment.

Referring to FIG. 3, there is depicted a schematic diagram of a proposed system according to an embodiment. The system 300 is configured to detect an error in a spreadsheet comprising a plurality of formulae.

The system 300 comprises an input interface 310 that is adapted to receive a spreadsheet 320 for analysis. By way of example, the input interface 310 may receive the spreadsheet 320 via a communication link (e.g. via the Internet) or from another component of a local system. In this example, the input interface is configured to read the spreadsheet (e.g. using conventional software such as Apache POI) and identify all of the formulae contained within the spreadsheet.

The identified formulae are then provided to a conversion component 330 of the system 300. The conversion component 330 is configured to convert each formula of the spreadsheet into a respective AST. In this example, the conversion component 330 is configured to: parse a formula (e.g. using a conventional parser); tokenize the formula; and construct a Concrete Syntax Tree, CST, based on the token of the formula. For each node in the CST, the conversion component 300 annotate each node of the CST with a supertype from a predetermined set. By way of example, this may be derived from grammar rules to create the CST. Such an exemplary set of types may include: Operand; Infix Operator; Prefix Operator; Postfix Operator; Operation; No-op.

Further categories with subtypes may include: Operand; Range; Ref; Relative Range; Relative Ref; Number; Text; Boolean/Logical; Blank; Infix Operator; Addition; Subtraction; Multiplication; Division; Prefix Operator; Negation; Postfix Operator; Exponent; Operation.

The conversion component 330 then assigns individual formula functions their own subtype: No-op; Whitespace; or Brackets. Also, the conversion component 330 removes al; No-Op nodes from the CST. Also, for each Operation/Function typed operation, any shortened or overloaded functions are replaced, e.g. all 3-argument VLOOKUP functions are replaced with their 4-argument VLOOKUP variant (4th argument is an optional). For this, child nodes are added where applicable to denote new arguments as needed.

In this way, the CST is converted to an AST by the conversion component 330.

A pattern encoding component 340 of the system 300 then encodes the structure of each AST as a pattern. For this, many existing pattern/template languages exist for use by the pattern encoding component 340. However, by way of example only. The pattern encoding component 340 of this exemplary embodiment employs Epsilon Pattern Language.

The patterns are then provided to a comparison component 350 of the system 300. The comparison component 350 is configured to compare the patterns to identify an anomalous formula based on the comparison result. In particular, the comparison component 350 of this embodiment is configured to compare each pattern against all other patterns and to determine number of differences and interpret the comparison rules to identify one or more anomalous formulae.

Purely by way of illustration, the comparison component 350 of this embodiment is configured to identify three different types of pattern, each being indicative of a particular type of error or anomaly in a formula.

A first type of pattern has: a low occurrence; and a small difference from a pattern having a high occurrence. This suggests an error in the less used pattern, such as a typo or missed argument.

A second type of pattern has: a high occurrence; and a small difference from a pattern having a high occurrence. This suggests duplication of formula that could be refactored.

A third type of pattern has: a low occurrence; and a large difference from all other patterns. This is indicative of an outlier formula, which may have been recorded in the spreadsheet by mistake.

In this example, the system also includes a classification component 360 configured to classify the identified anomalous formula based on indications provided by the comparison component 350.

Information 365 regarding the identified errors and their classification(s) is output from the system 300 via an output interface 370.

From the above description, it will be appreciated that the proposed embodiment provides an automated system for validating spreadsheet formulae and detecting errors.

By way of further illustration of the proposed concept(s), an exemplary method will now be described with reference to FIGS. 4A, 4B and 5 in combination with a spreadsheet extract.

Figure 4A:
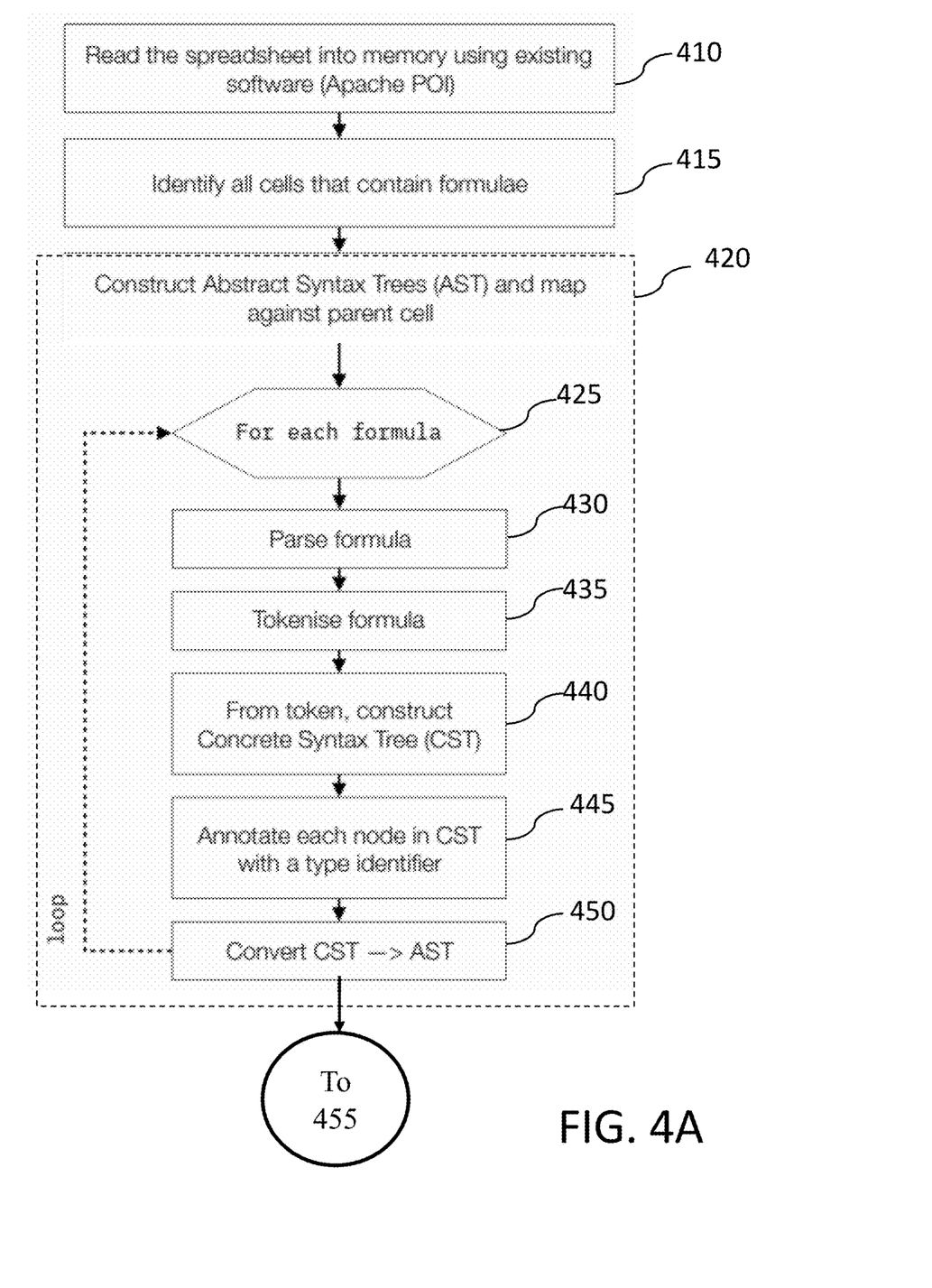
FIGS. 4A and 4B depict a flow diagram of method for detecting an error in a spreadsheet according to an embodiment.
Figure 4B:
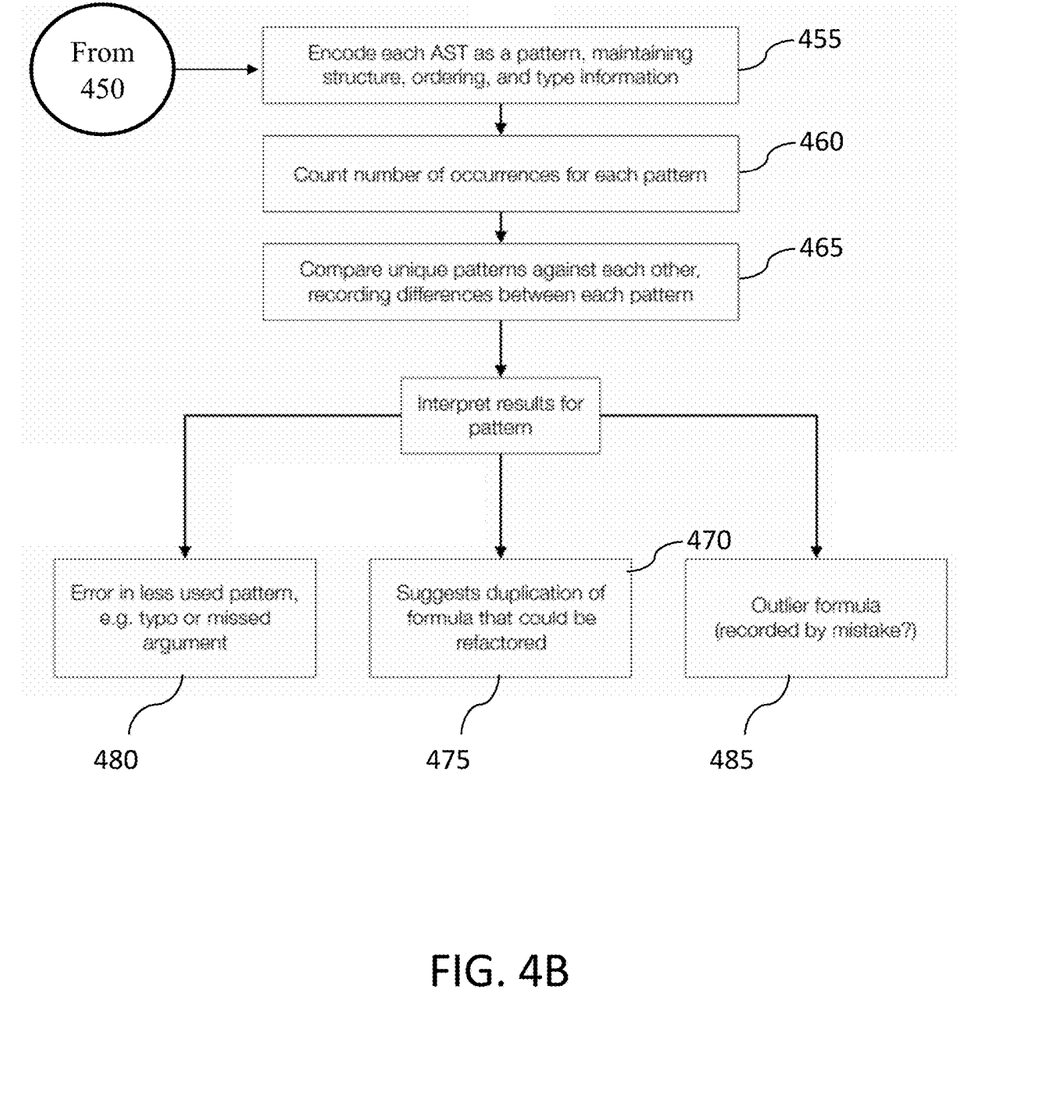
Figure 5:
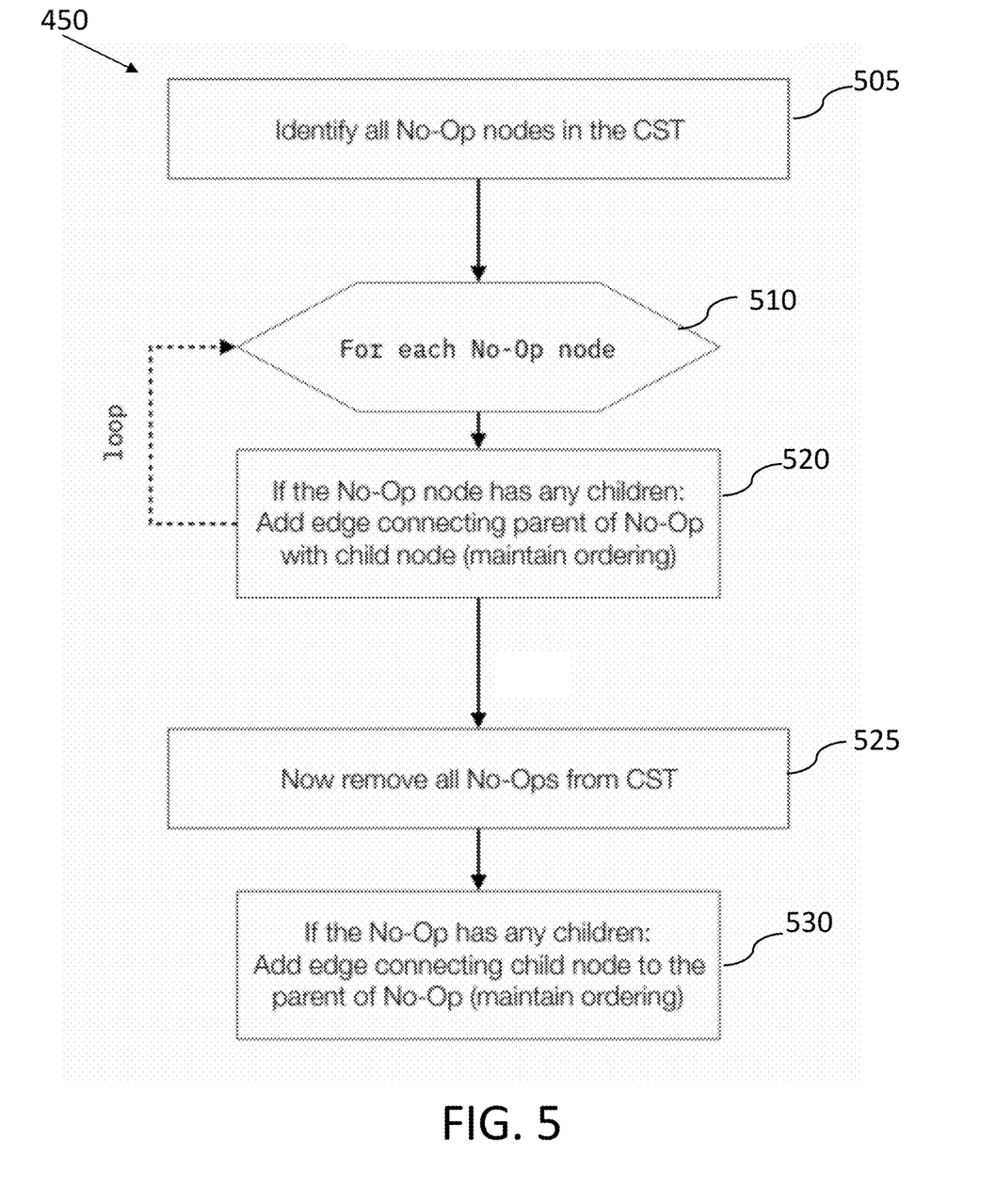
FIG. 5 is a flow diagram of a method for converting a Concrete Syntax Tree (CST) to an Abstract Syntax Tree (AST) employed by the embodiment of FIGS. 4A and 4B.

FIGS. 4A and 4B depict a flow diagram of a method for detecting an error in a spreadsheet according to an embodiment, and FIG. 5 is a flow diagram of a method for converting a Concrete Syntax Tree (CST) to an Abstract Syntax Tree (AST) employed by the embodiment of FIGS. 4A and 4B.

The following spreadsheet extract from an electronic spreadsheet will be used as an example when describing the method of FIGS. 4A, 4B and 5:

| Cell | Formula |
|------|---------|
| C5 | C4*VLOOKUP($A5,Assumptions!$B$4:$N$6,C$2) |
| D5 | D4*VLOOKUP($A5,Assumptions!$B$4:$N$6,D$2) |
| E5 | E4*VLOOKUP($A5,Assumptions!$B$4:$N$6,E$2) |
| F5 | F4*VLOOKUP($A5,Assumptions!$B$4:$N$6,F$2) |
| G5 | G4*VLOOKUP($A5,Assumptions!$B$4:$N$6,G$2) |
| H5 | H4*VLOOKUP($A5,Assumptions!$B$4:$N$6,H$2) |
| I5 | I4*VLOOKUP($A5,Assumptions!$B$4:$N$6,I$2) |
| J5 | J4*VLOOKUP($A5,Assumptions!$B$4:$N$6,J$2) |
| K5 | K4*VLOOKUP($A5,Assumptions!$B$4:$N$6,K$2) |
| L5 | L4*VLOOKUP($A5,Assumptions!$B$4:$N$6,L$2) |
| M5 | M4*VLOOKUP($A5,Assumptions!$B$4:$N$6,M$2) |

The above extract comprises cells C5:M5. In the above example extract, each cell is associated with a formula that performs a multiplication operation between two values. Both operands of the operation are themselves references to values in another cell in the spreadsheet. The first is a simple pointer, whereas the second is a lookup table based function that returns a numeric value. It will be noted from visual inspection of the above extract that these formulas are in some way related and a pattern is present.

Referring to FIG. 4A, the method begins in step 410 with loading/reading the spreadsheet into memory. For this, conventional software (such as Apache POI) can be used.

Next, in step 415, all cells of the spreadsheet that contain formulae are identified. Each identified formula is then converted into an AST in step 420. As depicted in FIG. 4A, the step 420 of converting the formulae into ASTs comprises a process (steps 425 to 450) which is repeated for each identified formula.

In more detail, the loop procedure begins with step 425 identifying a formula that remains to be converted to an AST. If a formula remains, the formula is parsed in step 430 and then tokenized in step 435. From the token, a CCST is constructed in step 440, and then each node of the CST is annotated with a type identifier in step 445. Finally, the CST is converted to an AST in step 450. Step 450 also comprises checking if any formula remains to be converted. If a formula remains to be converted, the method loops back to step 425 in order for the process to be repeated. In this way, the process loops/repeats until all of the identified formulae have been converted to an AST.

By way of further explanation of the process of converting a CST to an AST in step 450, FIG. 5 shows an exemplary method of converting a CST to an AST as may be employed in step 450 of FIG. 4. Specifically, the process begins with the step 505 of identifying all No-Op nodes in the CST. It is checked in step 510 whether a No-Op node remains to be processed. If a No-Op node of the CST remains to be processed, step 520 is undertaken, wherein, if the No-Op node has any children, an edge is added which connects the No-Op parent with the No-Op child (whilst maintaining ordering). This loops/repeats until all of the No-Op node have been processed. Upon completion of this loop, the method proceeds to step 525 in which all No-Op nodes are removed from the CST. Finally, in step 530, if a No-Op node has any children, an edge is added which connects the No-Op parent with the No-Op child (whilst maintaining ordering). What remains is then an AST.

Referring now back to the method of FIG. 4A, after converting each of identified formulae to an AST, the method continues as depicted in the flow diagram of FIG. 4B. More specifically, the method proceeds to step 455, wherein each of the ASTs is encoded as a pattern (maintaining structure, ordering and type information).

Considering the exemplary spreadsheet extract above, it can be encoded as follows:

| Cell | Formula with absolute references | R1C1 Absolute Formula/Encoded Pattern |
|------|----------------------------------|----------------------------------------|
| C5 | C4*'Assumptions'!C4 | (R[-1]C[0]*'Assumptions'!R[-1]C[0]) |
| D5 | D4*'Assumptions'!D4 | (R[-1]C[0]*'Assumptions'!R[-1]C[0]) |
| E5 | E4*'Assumptions'!E4 | (R[-1]C[0]*'Assumptions'!R[-1]C[0]) |
| F5 | F4*'Assumptions'!F4 | (R[-1]C[0]*'Assumptions'!R[-1]C[0]) |
| G5 | G4*'Assumptions'!G4 | (R[-1]C[0]*'Assumptions'!R[-1]C[0]) |
| H5 | H4*'Assumptions'!H4 | (R[-1]C[0]*'Assumptions'!R[-1]C[0]) |
| I5 | I4*'Assumptions'!I4 | (R[-1]C[0]*'Assumptions'!R[-1]C[0]) |
| J5 | J4*'Assumptions'!J4 | (R[-1]C[0]*'Assumptions'!R[-1]C[0]) |
| K5 | K4*'Assumptions'!K4 | (R[-1]C[0]*'Assumptions'!R[-1]C[0]) |

-continued

| Cell | Formula with absolute references | R1C1 Absolute Formula/Encoded Pattern |
|---|---|---|
| L5 | L4*'Assumptions'!L4 | (R[−1]C[0]*'Assumptions'!R[−1]C[0]) |
| M5 | M4*'Assumptions'!M4 | (R[−1]C[0]*'Assumptions'!R[−1]C[0]) |

More specifically, the steps for creating encoded patterns are as follows:

(A) Replace any referencing/lookup/indexing functions with a reference to the resulting cell. i.e. if A1*VLOOKUP (B1, C1:D5, 2) evaluates to the value located in C3, replace the entire function with the reference C3 to give A1*C3. Here: (a) brackets should be added where necessary to preserve evaluation precedence; and (b) where necessary, the new references should be qualified with their sheet name to avoid ambiguity.

(B) Transform all absolute/direct references (A1 style) to relative/indirect references (R1C1 style—a widely known notation).

This manner of encoding allows the mapping of multiple cells to the same encoding as follows:

| Cells | Encoded Pattern | Occurrences |
|---|---|---|
| C5:M5 | (R[−1]C[0]*'Assumptions'!R[−1]C[0]) | 11 |

In our example cells in the range C5:M5 have the encoding (R[−1]C[0]*'Assumptions'!R[−1]C[0]).

In step 460, the number of occurrences for each pattern is determined. By way of illustration, the number of encoding occurrences of the encoded pattern of the above example is also detailed (i.e. 11).

Then, in step 465, the encoded patterns are compared against each other to establish differences between each pattern. Based on: a) number of occurrences or b) difference between patterns (e.g. string metrics), errors in the formulae are then inferred in step 470.

By way of example, FIG. 4b illustrates the method for identifying errors of three different types based on number of occurrences and difference between patterns. Specifically, identification of two patterns with high occurrence (i.e. a value of number of occurrences exceeding a predetermined threshold value) and low difference (i.e. a value of a difference measure/metric not exceeding a predetermined threshold value) results in the method proceeding to step 475. In step 475, it is inferred that a formula has been duplicated and could be refactored. Conversely, identification of a pattern with low occurrence (i.e. a value of number of occurrences not exceeding a predetermined threshold value) and low/small difference from another pattern (i.e. a value of a difference measure/metric not exceeding a predetermined threshold value) results in the method proceeding to step 480. In step 480, it is inferred that an error is in a sparsely used or isolated pattern (such as a typographical error or a missed argument for example). Also, identification of a pattern with low occurrence (i.e. a value of number of occurrences not exceeding a predetermined threshold value) and high/large difference from another pattern (i.e. a value of a difference measure/metric exceeding a predetermined threshold value) results in the method proceeding to step 485. In step 485, it is inferred that an error relates to an outlier formula (that may be have been included by mistake for example).

By way of further explanation and illustration, various different type of errors and how they may be inferred from the proposed pattern matching concept, will now be described (with reference to the exemplary spreadsheet extract) in the following sections.

Operand Errors/Incorrect Variables

Characterised by comparing two patterns with a high difference in occurrence but a low difference in string metrics. By way of example, consider the following case where Cell N5 has a syntactically correct, but functionally incorrect, formula:

| Cell | Original Formula | R1C1 Absolute Formula/Encoded Pattern |
|---|---|---|
| C5 | C4*VLOOKUP($A5,Assumptions!$B$4:$N$6,C$2) | (R[−1]C[0]*'Assumptions'!R[−1]C[0]) |
| D5 | D4*VLOOKUP($A5,Assumptions!$B$4:$N$6,D$2) | (R[−1]C[0]*'Assumptions'!R[−1]C[0]) |
| E5 | E4*VLOOKUP($A5,Assumptions!$B$4:$N$6,E$2) | (R[−1]C[0]*'Assumptions'!R[−1]C[0]) |
| F5 | F4*VLOOKUP($A5,Assumptions!$B$4:$N$6,F$2) | (R[−1]C[0]*'Assumptions'!R[−1]C[0]) |
| G5 | G4*VLOOKUP($A5,Assumptions!$B$4:$N$6,G$2) | (R[−1]C[0]*'Assumptions'!R[−1]C[0]) |
| H5 | H4*VLOOKUP($A5,Assumptions!$B$4:$N$6,H$2) | (R[−1]C[0]*'Assumptions'!R[−1]C[0]) |
| I5 | I4*VLOOKUP($A5,Assumptions!$B$4:$N$6,I$2) | (R[−1]C[0]*'Assumptions'!R[−1]C[0]) |
| J5 | J4*VLOOKUP($A5,Assumptions!$B$4:$N$6,J$2) | (R[−1]C[0]*'Assumptions'!R[−1]C[0]) |
| K5 | K4*VLOOKUP($A5,Assumptions!$B$4:$N$6,K$2) | (R[−1]C[0]*'Assumptions'!R[−1]C[0]) |
| L5 | L4*VLOOKUP($A5,Assumptions!$B$4:$N$6,L$2) | (R[−1]C[0]*'Assumptions'!R[−1]C[0]) |
| M5 | M4*VLOOKUP($A5,Assumptions!$B$4:$N$6,M$2) | (R[−1]C[0]*'Assumptions'!R[−1]C[0]) |
| N5 | N3*VLOOKUP($A5,Assumptions!$B$4:$N$6,N$2) | (R[−1]C[0]*'Assumptions'!R[−1]C[0]) |

In encoded form, this may be represented as follows:

| Cells | Encoded Pattern | Occurrences |
|---|---|---|
| C5:M5 | (R[−1]C[0]*'Assumptions'!R[−1]C[0]) | 11 |
| N5 | (R[−2]C[0]*'Assumptions'!R[−1]C[0]) | 1 |

Comparison of the above two patterns gives:

(i) A low string metric difference (e.g. only 1 character difference), suggesting that cells C5 to N5 are related to each other; and (ii) A high difference between occurrences, suggesting that pattern 2 features an anomalous formula. This is reinforced by the single occurrence of this pattern.

Therefore, it can be inferred that cell N5 contains a formula with an incorrect first argument.

Semantically Unrelated Formula

Characterised by comparing two patterns with a high difference in occurrence and a high difference in string metrics. By way of example, consider the following case where Cell N5 has been introduced:

| Cell | Original Formula | R1C1 Absolute Formula/Encoded Pattern |
|---|---|---|
| C5 | C4*VLOOKUP($A5,Assumptions!$B$4:$N$6,C$2) | (R[−1]C[0]*'Assumptions'!R[−1]C[0]) |
| D5 | D4*VLOOKUP($A5,Assumptions!$B$4:$N$6,D$2) | (R[−1]C[0]*'Assumptions'!R[−1]C[0]) |
| E5 | E4*VLOOKUP($A5,Assumptions!$B$4:$N$6,E$2) | (R[−1]C[0]*'Assumptions'!R[−1]C[0]) |
| F5 | F4*VLOOKUP($A5,Assumptions!$B$4:$N$6,F$2) | (R[−1]C[0]*'Assumptions'!R[−1]C[0]) |
| G5 | G4*VLOOKUP($A5,Assumptions!$B$4:$N$6,G$2) | (R[−1]C[0]*'Assumptions'!R[−1]C[0]) |
| H5 | H4*VLOOKUP($A5,Assumptions!$B$4:$N$6,H$2) | (R[−2]C[0]*'Assumptions'!R[−1]C[0]) |
| I5 | I4*VLOOKUP($A5,Assumptions!$B$4:$N$6,I$2) | (R[−2]C[0]*'Assumptions'!R[−1]C[0]) |
| J5 | J4*VLOOKUP($A5,Assumptions!$B$4:$N$6,J$2) | (R[−2]C[0]*'Assumptions'!R[−1]C[0]) |
| K5 | K4*VLOOKUP($A5,Assumptions!$B$4:$N$6,K$2) | (R[−2]C[0]*'Assumptions'!R[−1]C[0]) |
| L5 | L4*VLOOKUP($A5,Assumptions!$B$4:$N$6,L$2) | (R[−2]C[0]*'Assumptions'!R[−1]C[0]) |
| M5 | M4*VLOOKUP($A5,Assumptions!$B$4:$N$6,M$2) | (R[−2]C[0]*'Assumptions'!R[−1]C[0]) |
| N5 | 6 + 5 | (6 + 5) |

In encoded form, this may be represented as follows:

| Cells | Encoded Pattern | Occurrences |
|---|---|---|
| C5:M5 | (R[−1]C[0]*'Assumptions'!R[−1]C[0]) | 11 |
| N5 | (6 + 5) | 1 |

Comparison of these two patterns gives:

(i) A high string metric difference, suggesting the patterns/formulae are unrelated (ii) A high difference between occurrences, suggesting that pattern 2 is anomalous. This is reinforced by the single occurrence of this pattern.

Therefore, it can be inferred that cell N5 contains a formula that is performing a calculation unique to the spreadsheet, which may have been accidentally introduced for example. Further analysis on the actual formula may need to be performed to determine whether or not the formula is useful or not i.e. by adding a semantic analysis of the formula.

Formula Duplication

| Cell | Original Formula | R1C1 Absolute Formula/Encoded Pattern |
|---|---|---|
| C5 | C4*VLOOKUP($A5,Assumptions!$B$4:$N$6,C$2) | (R[−1]C[0]*'Assumptions'!R[−1]C[0]) |
| D5 | D4*VLOOKUP($A5,Assumptions!$B$4:$N$6,D$2) | (R[−1]C[0]*'Assumptions'!R[−1]C[0]) |
| E5 | E4*VLOOKUP($A5,Assumptions!$B$4:$N$6,E$2) | (R[−1]C[0]*'Assumptions'!R[−1]C[0]) |
| F5 | F4*VLOOKUP($A5,Assumptions!$B$4:$N$6,F$2) | (R[−1]C[0]*'Assumptions'!R[−1]C[0]) |
| G5 | G4*VLOOKUP($A5,Assumptions!$B$4:$N$6,G$2) | (R[−1]C[0]*'Assumptions'!R[−1]C[0]) |
| H5 | H3*VLOOKUP($A5,Assumptions!$B$4:$N$6,H$2) | (R[−1]C[0]*'Assumptions'!R[−1]C[0]) |
| I5 | I3*VLOOKUP($A5,Assumptions!$B$4:$N$6,I$2) | (R[−1]C[0]*'Assumptions'!R[−1]C[0]) |
| J5 | J3*VLOOKUP($A5,Assumptions!$B$4:$N$6,J$2) | (R[−1]C[0]*'Assumptions'!R[−1]C[0]) |

-continued

| Cell | Original Formula | R1C1 Absolute Formula/Encoded Pattern |
|---|---|---|
| K5 | K3*VLOOKUP($A5,Assumptions!$B$4:$N$6,K$2) | (R[−1]C[0]*'Assumptions'!R[−1]C[0]) |
| L5 | L3*VLOOKUP($A5,Assumptions!$B$4:$N$6,L$2) | (R[−1]C[0]*'Assumptions'!R[−1]C[0]) |

In encoded form, this may be represented as follows:

| Cells | Encoded Pattern | Occurrences |
|---|---|---|
| C5:G5 | (R[−1]C[0]*'Assumptions'!R[−1]C[0]) | 5 |
| H5:L5 | (R[−2]C[0]*'Assumptions'!R[−1]C[0]) | 5 |

Comparison of the above two patterns gives:

(i) A low string metric difference (e.g. only 1 character difference), suggesting cell ranges C5:G5 and H5:L5 are related; and (ii) A low difference between occurrences, suggesting cell ranges C5:G5 and H5:L5 are related.

Therefore, it can be inferred that these two cell ranges are performing similar calculations and can potentially be refactored into a more cohesive formula.

Figure 6:
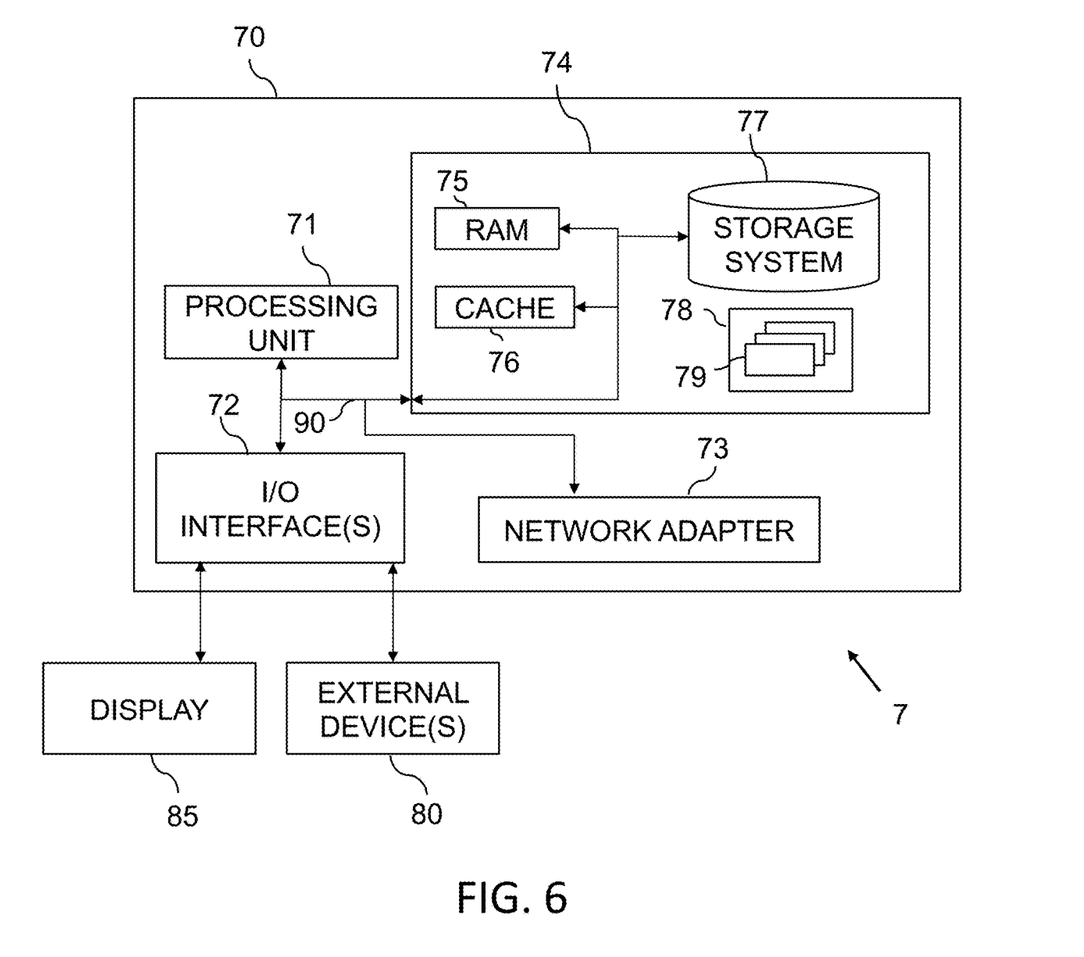
FIG. 6 illustrates a system according to another embodiment.

By way of yet further example, embodiments may comprise a computer system 70, which may form part of a networked system 7 illustrated in FIG. 6. For instance, a conversion component configured to convert each formula of the spreadsheet into a respective AST may be implemented in the computer system 70 (e.g. as a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the Input/Output (I/O) interface 72 perform a method for detecting an error in a spreadsheet comprising a plurality of formulae according to a proposed embodiment. Program/utility 78, having a set (at least one) of program modules 79, may be stored in memory 74. Program modules 79 generally carry out the functions and/or methodologies of proposed embodiments for detecting an error in a spreadsheet comprising a plurality of formulae.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate with a service mesh).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for detecting errors in a spreadsheet comprising pluralities of formulae, the method comprising:
converting each formula of the spreadsheet into a respective abstract syntax tree (AST);
encoding the structure of each AST as a pattern; and
comparing the patterns and identifying an anomalous formula based on the comparison result, wherein the comparing the patterns and identifying an anomalous formula based on the comparison result further comprises:
identifying a second anomalous formula as a duplicated formula by:
detecting a second pattern having:
a value of number of occurrences exceeding a first predetermined threshold value; and
a value of a difference measure not exceeding a second predetermined threshold value; and
identifying the respective formula of the AST corresponding to the detected second pattern as the second anomalous formula;
classifying the identified respective formula as the first anomalous formula.

2. The method of claim 1, wherein comparing to patterns to identify an anomalous formula comprises:
for each pattern, comparing the pattern against all of the other patterns to determine differences between the patterns; and
identifying an anomalous formula based on the determined differences.

3. The method of claim 2, further comprising:
classifying the identified anomalous formula based on a determined difference between two patterns and a number of occurrences of at least one of the two patterns.

4. The method of claim 2, wherein identifying an anomalous formula comprises:
identifying a first anomalous formula as an incorrectly typed formula by:
detecting a first pattern having: a value of number of occurrences not exceeding a first predetermined threshold value; and a value of a difference measure not exceeding a second predetermined threshold value; and identifying the respective formula of the AST corresponding to the detected first pattern as a first anomalous formula.

5. The method of claim 2, wherein identifying an anomalous formula comprises:

identifying a third anomalous formula as an outlier formula by:

detecting a third pattern having: a value of number of occurrences not exceeding a first predetermined threshold value; and a value of a difference measure exceeding a second predetermined threshold value; and identifying the respective formula of the AST corresponding to the detected third pattern as a third anomalous formula.

6. The method of claim 2, wherein converting a formula of the spreadsheet into a respective AST comprises:

parsing the formula;
tokenizing the formula;
constructing a concrete syntax tree (CST) based on the token of the formula;
annotating each node of the CST with a type identifier; and
converting the annotated CST to an AST.

7. The method of claim 6, wherein converting the annotated CST to an AST comprises:

removing a node from the annotated CST which has an annotation belonging to a set of target annotations.

8. The method of claim 1, further comprising:
ordering and grouping the patterns by number of occurrences.

9. A computer program product for detecting errors in a spreadsheet comprising pluralities of formulae, the computer program product comprising:

a computer readable storage medium having program instructions embodied therewith, the program instructions executable by a processing unit to cause the processing unit to perform a method comprising:

converting each formula of the spreadsheet into a respective abstract syntax tree (AST);
encoding the structure of each AST as a pattern; and
comparing the patterns and identifying an anomalous formula based on the comparison result, wherein the comparing the patterns and identifying an anomalous formula based on the comparison result further comprises:

identifying a third anomalous formula as an outlier formula by:
detecting a third pattern having:
a value of number of occurrences not exceeding a first predetermined threshold value; and
a value of a difference measure exceeding a second predetermined threshold value; and
identifying the respective formula of the AST corresponding to the detected third pattern as the third anomalous formula;

classifying the identified respective formula as the first anomalous formula.

10. A system for detecting errors in a spreadsheet comprising pluralities of formulae, the system comprising:

one or more computer processors, one or more computer-readable storage media, and program instructions stored on one or more of the computer-readable storage media for execution by at least one of the one or more processors, the program instructions comprising:

converting each formula of the spreadsheet into a respective abstract syntax tree (AST);
encoding the structure of each AST as a pattern; and
comparing the patterns and identifying an anomalous formula based on the comparison result, wherein the comparing the patterns and identifying an anomalous formula based on the comparison result further comprises:

identifying a first anomalous formula as an incorrectly typed formula by:
detecting a first pattern having:
a value of number of occurrences of the first pattern not exceeding a first predetermined threshold value, and
a value of a difference measure not exceeding a second predetermined threshold value; and
identifying the respective formula of the AST corresponding to the detected first pattern as the first anomalous formula;

classifying the identified respective formula as the first anomalous formula.

11. The system of claim 1, wherein the comparing the patterns and identifying an anomalous formula based on the comparison result further comprises:

identifying a second anomalous formula as a duplicated formula by:
detecting a second pattern having: a value of number of occurrences exceeding a first predetermined threshold value; and a value of a difference measure not exceeding a second predetermined threshold value; and
identifying the respective formula of the AST corresponding to the detected second pattern as the second anomalous formula.

12. The system of claim 1, wherein the comparing the patterns and identifying an anomalous formula based on the comparison result further comprises:

identifying a third anomalous formula as an outlier formula by:
detecting a third pattern having: a value of number of occurrences not exceeding a first predetermined threshold value; and a value of a difference measure exceeding a second predetermined threshold value; and
identifying the respective formula of the AST corresponding to the detected third pattern as a third anomalous formula.

13. The system of claim 1, wherein the converting each formula of the spreadsheet into a respective AST further comprises:

parsing the formula;
tokenizing the formula;
constructing a concrete syntax tree (CST) based on the token of the formula;
annotating each node of the CST with a type identifier; and
converting the annotated CST to an AST.

14. The system of claim 13, wherein the converting the annotated CST to an AST further comprises:

removing a node from the annotated CST which has an annotation belonging to a set of target annotations.

15. The system of claim 1, further comprising:
ordering and grouping the patterns by number of occurrences.

* * * * *